(12) United States Patent
Lin

(10) Patent No.: US 9,497,369 B1
(45) Date of Patent: Nov. 15, 2016

(54) COMPLEX CONTROL DEVICE AND SELFIE APPARATUS

(71) Applicant: Chia-Ching Lin, Taipei (TW)

(72) Inventor: Chia-Ching Lin, Taipei (TW)

( * ) Notice: Subject to any disclaimer, the term of this patent is extended or adjusted under 35 U.S.C. 154(b) by 30 days.

(21) Appl. No.: 14/723,308

(22) Filed: May 27, 2015

(51) Int. Cl.
  *H04N 5/225* (2006.01)
  *F21K 5/06* (2006.01)
  *G03B 15/04* (2006.01)
  *H04N 5/235* (2006.01)

(52) U.S. Cl.
  CPC .......... *H04N 5/2256* (2013.01); *G03B 15/041* (2013.01); *G03B 15/0442* (2013.01); *H04N 5/2252* (2013.01); *H04N 5/2354* (2013.01)

(58) Field of Classification Search
  CPC ............. H04N 5/2251; H04N 5/2252; H04N 5/2256; H04N 5/2354; G03B 15/041; G03B 15/0442; G03B 17/568
  See application file for complete search history.

(56) References Cited

U.S. PATENT DOCUMENTS

| | | | | | |
|---|---|---|---|---|---|
| 4,592,635 | A * | 6/1986 | Vaughn | ................... | G03B 15/05 396/206 |
| 5,325,143 | A * | 6/1994 | Kawano | ................. | G03B 17/02 396/420 |
| 6,256,060 | B1 * | 7/2001 | Wakui | ................... | H04N 1/2112 348/207.11 |
| 6,819,942 | B2 * | 11/2004 | Aotake | ................ | H04M 1/6058 348/E5.029 |
| 7,184,807 | B2 * | 2/2007 | Shimamura | ......... | H04M 1/0214 455/556.1 |
| 7,486,883 | B2 * | 2/2009 | McNary | ................... | G03B 9/70 348/211.2 |
| 9,395,606 | B1 * | 7/2016 | Harris | ................... | G03B 17/565 |
| 2004/0156627 | A1 * | 8/2004 | Lin | ......................... | G03B 17/00 396/56 |
| 2011/0285315 | A1 * | 11/2011 | Matthews | ................. | F21L 4/00 315/294 |
| 2015/0355525 | A1 * | 12/2015 | Abrams | ................. | H04N 5/225 348/207.11 |

* cited by examiner

*Primary Examiner* — Daniel M Pasiewicz
(74) *Attorney, Agent, or Firm* — Li & Cai Intellectual Property (USA) Office

(57) ABSTRACT

A complex control device includes a wireless selfie shutter and a flasher detachably installed in the wireless selfie shutter. The wireless selfie shutter has a first shell, a starting key and two transmitting modules arranged in the first shell, and the transmitting modules are electrically connected to the starting key. The flasher has a second shell detachably installed on the first shell, an LED flash and a control module arranged in the second shell. The control module is electrically connected to the LED flash. When the flasher is separated from the wireless selfie shutter, the second shell is used for inserting into a connector jack of a mobile communication device, thereby respectively transmitting two starting signals of the transmitting modules to the mobile communication device and the control module of the flasher when the starting key is pressed. Additionally, the instant disclosure provides a selfie apparatus.

10 Claims, 10 Drawing Sheets

COMPLEX CONTROL DEVICE AND SELFIE APPARATUS

BACKGROUND OF THE INVENTION

1. Field of the Invention

The instant invention relates to a control device; in particular, to a complex control device and a selfie apparatus.

2. Description of Related Art

Conventional communication devices (i.e., smart phones) usually have a front camera and a rear camera, and more and more users take a selfie by using the front camera of the communication device. Accordingly, a wireless selfie shutter has been developed to remotely control the front camera of the communication device. However, the communication device is provided without any flasher arranged around the front camera, such that in a place or time of relatively inadequate light, the user always gets a poor quality picture by using the front camera of the communication device.

SUMMARY OF THE INVENTION

The instant disclosure provides a complex control device and a selfie apparatus for improving the problem generated from the communication device provided without any flasher arranged around the front camera.

The instant disclosure provides a complex control device, comprising: a wireless selfie shutter, comprising: a first shell surroundingly defining a first accommodating space, wherein the first shell has a first combining portion, and the first combining portion has an inserting hole in air communication with the first accommodating space; a starting key arranged in the first accommodating space of the first shell; two transmitting modules arranged in the first accommodating space of the first shell, wherein the transmitting modules are electrically connected to the starting key, and the transmitting modules are configured to respectively transmit two starting signals by pressing the starting key; and a battery arranged in the first accommodating space of the first shell, wherein the battery is configured to provide an energy to operate the wireless selfie shutter; and a flasher detachably combined with the wireless selfie shutter, comprising: a second shell surroundingly defining a second accommodating space, wherein the second shell has a translucent area and a second combining portion, the second combining portion has an insulating pillar arranged out of the second accommodating space, wherein the second combining portion is detachably combined with the first combining portion, and the insulating pillar passes through the inserting hole and is arranged in the first accommodating space; an LED flash arranged in the second accommodating space of the second shell, wherein the LED flash faces the translucent area of the second shell; a control module arranged in the second accommodating space of the second shell, wherein the control module is electrically connected to the LED flash and is configured to drive the LED flash for lighting; and a rechargeable battery arranged in the second accommodating space of the second shell, wherein the rechargeable battery is configured to provide an energy to operate the flasher; wherein when the flasher is separated from the wireless selfie shutter, the insulating pillar is configured to insert into a connector jack of a mobile communication device without any electrical connection therebetween, and the two transmitting modules are respectively transmitting two starting signals to the mobile communication device and the control module of the flasher for causing the mobile communication device to take a picture and the LED flash of the flasher to light at the same time by pressing the starting key.

The instant disclosure also provides a selfie apparatus, comprising: a mobile communication device having a front camera and a connector jack, wherein the mobile communication device is provided without any flasher arranged around the front camera; and a complex control device, comprising: a wireless selfie shutter, comprising: a first shell surroundingly defining a first accommodating space, wherein the first shell has a first combining portion, and the first combining portion has an inserting hole in air communication with the first accommodating space; a starting key arranged in the first accommodating space of the first shell; two transmitting modules arranged in the first accommodating space of the first shell, wherein the transmitting modules are electrically connected to the starting key, and the transmitting modules are configured to respectively transmit two starting signals by pressing the starting key; and a battery arranged in the first accommodating space of the first shell, wherein the battery is configured to provide an energy to operate the wireless selfie shutter; and a flasher detachably combined with one of the wireless selfie shutter and the mobile communication device, comprising: a second shell surroundingly defining a second accommodating space, wherein the second shell has a translucent area and a second combining portion, the second combining portion has an insulating pillar arranged out of the second accommodating space; an LED flash arranged in the second accommodating space of the second shell, wherein the LED flash faces the translucent area of the second shell; a control module arranged in the second accommodating space of the second shell, wherein the control module is electrically connected to the LED flash and is configured to drive the LED flash for lighting; and a rechargeable battery arranged in the second accommodating space of the second shell, wherein the rechargeable battery is configured to provide an energy to operate the flasher; wherein when the flasher is combined with the wireless selfie shutter, the second combining portion is detachably combined with the first combining portion, and the insulating pillar passes through the inserting hole and is arranged in the first accommodating space; wherein when the flasher is combined with mobile communication device, the insulating pillar is inserted into the connector jack without any electrical connection therebetween, and the two transmitting modules are respectively transmitting two starting signals to the front camera of the mobile communication device and the control module of the flasher for causing the front camera of the mobile communication device to take a picture and the LED flash of the flasher to light at the same time by pressing the starting key.

In summary, the complex control device and the selfie apparatus of the instant disclosure are provided with the flash electrically isolated to the mobile communication device, the flasher can be positioned on the mobile communication device by inserting the insulating pillar into the connector jack, and the mobile communication device and the LED flash of the flasher can be operated at the same time by pressing the single starting key. Thus, in a place or time of relatively inadequate lighting, the communication device can be used to get a quality picture by use of the complex control device.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 10, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
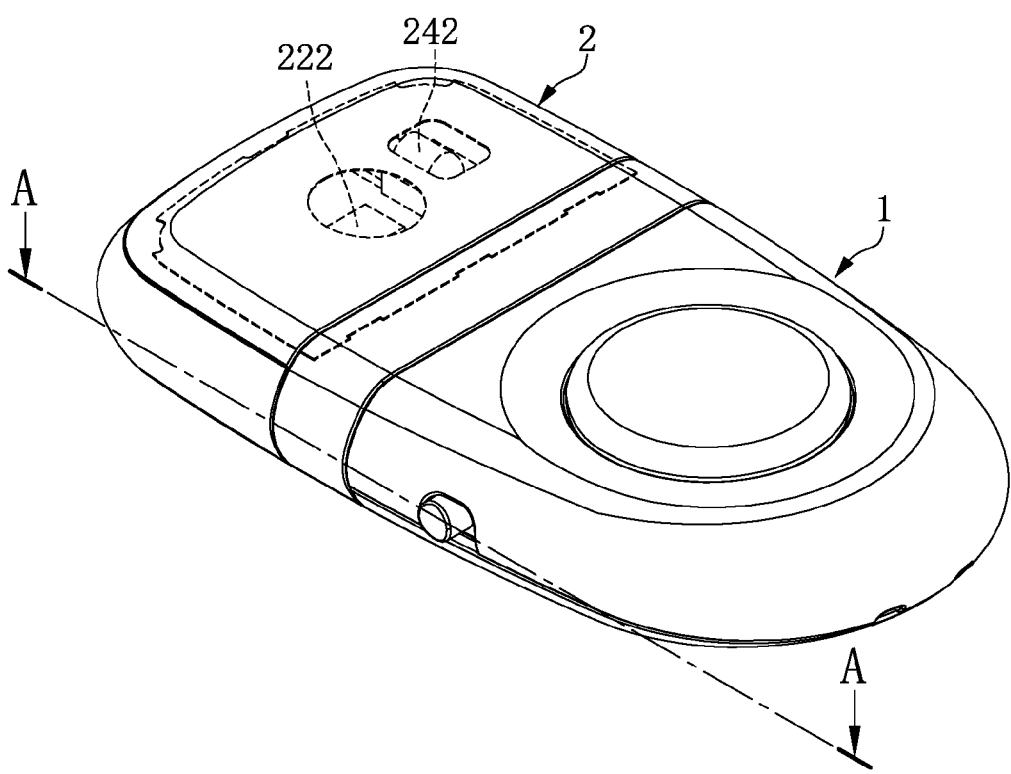
FIG. 1 is a perspective view showing a complex control device according to the instant disclosure.
Figure 2:
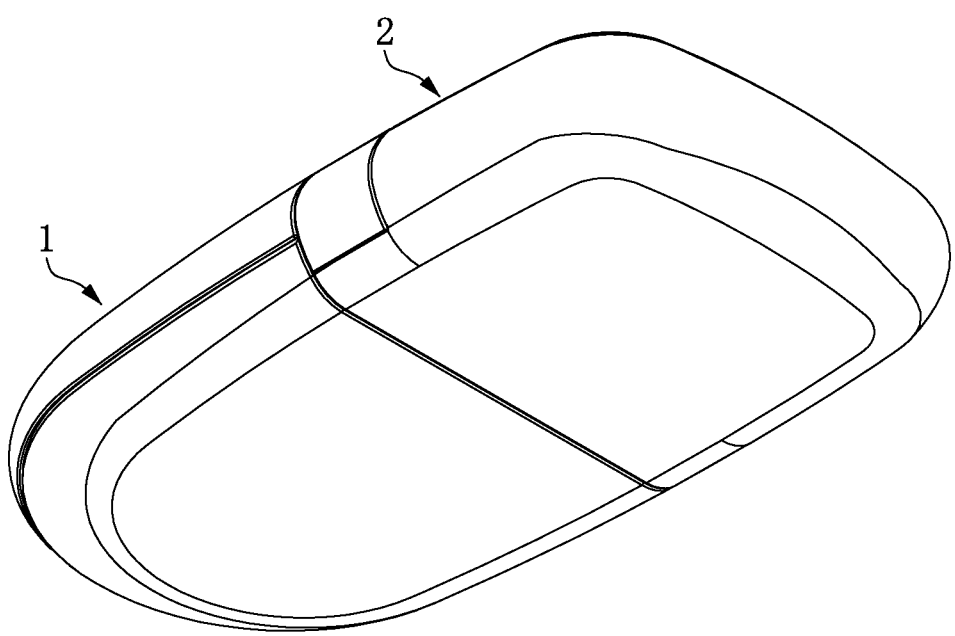
FIG. 2 is a perspective view showing the complex control device from another viewing angle.
Figure 10:
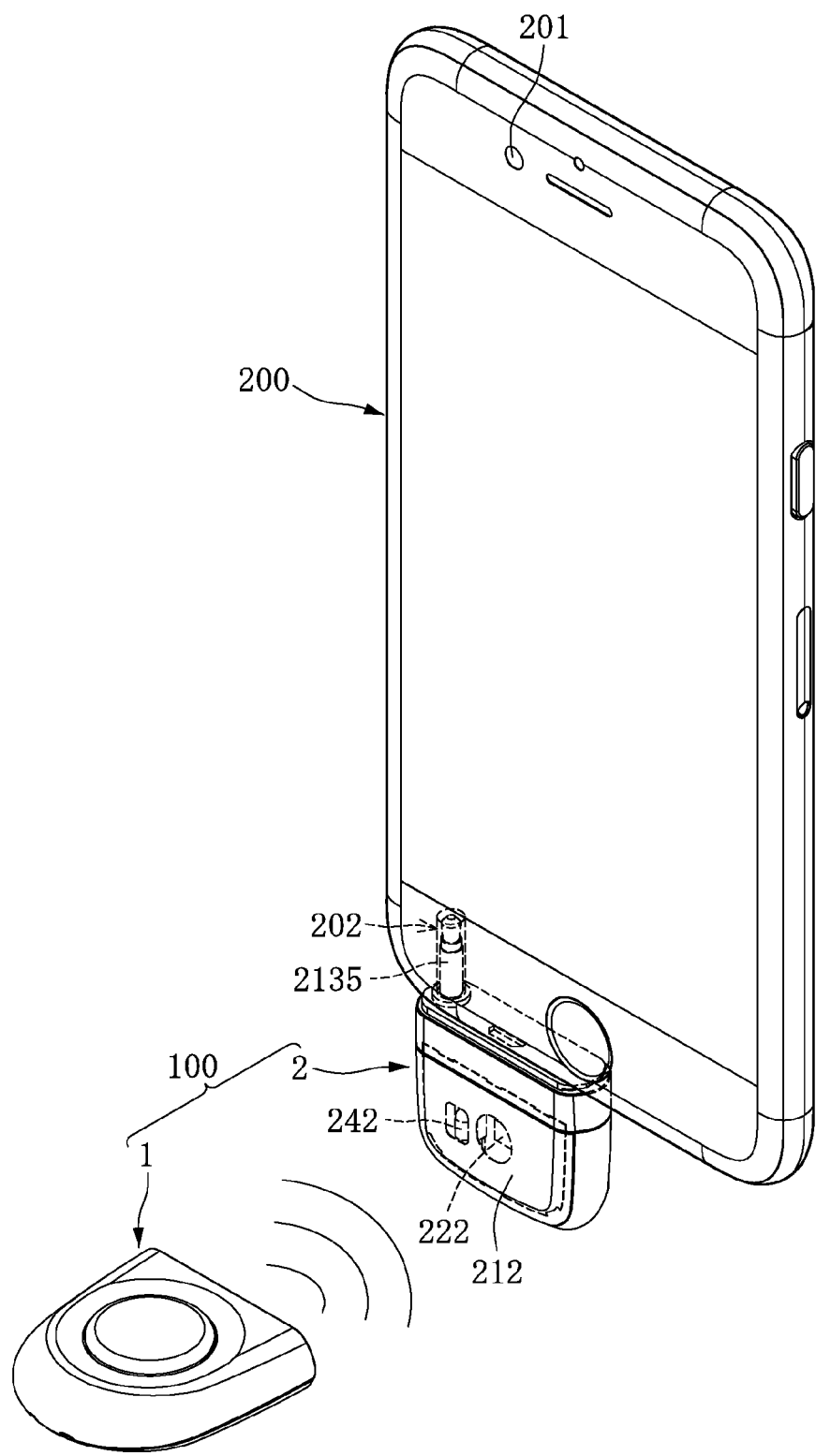
FIG. 10 is perspective view showing a selfie apparatus according to the instant disclosure.

As shown in FIGS. 1 and 2, the instant embodiment provides a complex control device 100 applied to a mobile communication device 200 (as shown in FIG. 10), and the mobile communication device 200 in the instant embodiment is a smart phone for example, but is not limited thereto. For example, the mobile communication device 200 can be a tablet computer. Moreover, the mobile communication device 200 in the instant embodiment has a front camera 201 and a connector jack 202, and the mobile communication device 200 does not have any flasher to provide light for the front camera 201. The connector jack 202 in the instant embodiment is an earphone jack for example, but is not limited thereto.

The complex control device 100 includes a wireless selfie shutter 1 and a flasher 2 detachably combined to the wireless selfie shutter 1. The wireless selfie shutter 1 is manipulatable to control the front camera 201 of the mobile communication device 200 and the flasher 2 at the same time, so that when the front camera 201 is operated to take a picture, the flasher 2 is operated to provide enough light for the front camera 202 at the same time. The following description discloses the construction of the wireless selfie shutter 1 and the construction of the flasher 2, and then discloses the relationship between the wireless selfie shutter 1 and the flasher 2.

Figure 3:
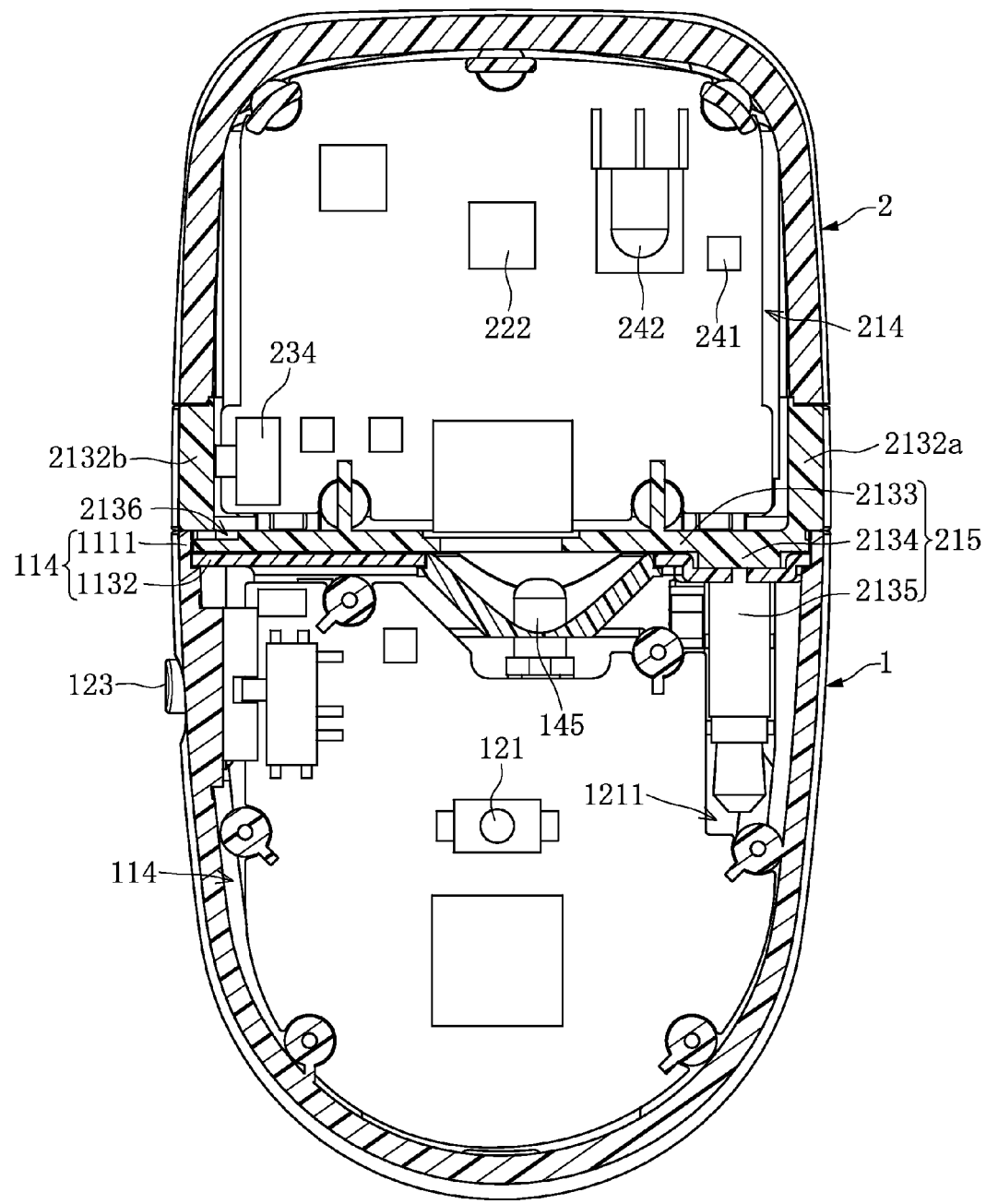
FIG. 3 is a cross-sectional view along a sectional line X-X of FIG. 1.
Figure 4:
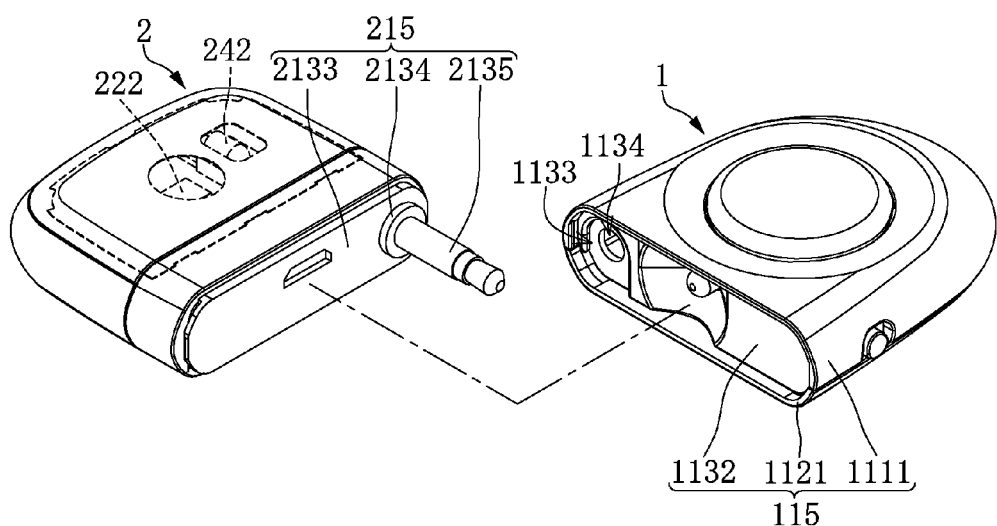
FIG. 4 is an exploded view showing the complex control device.
Figure 5:
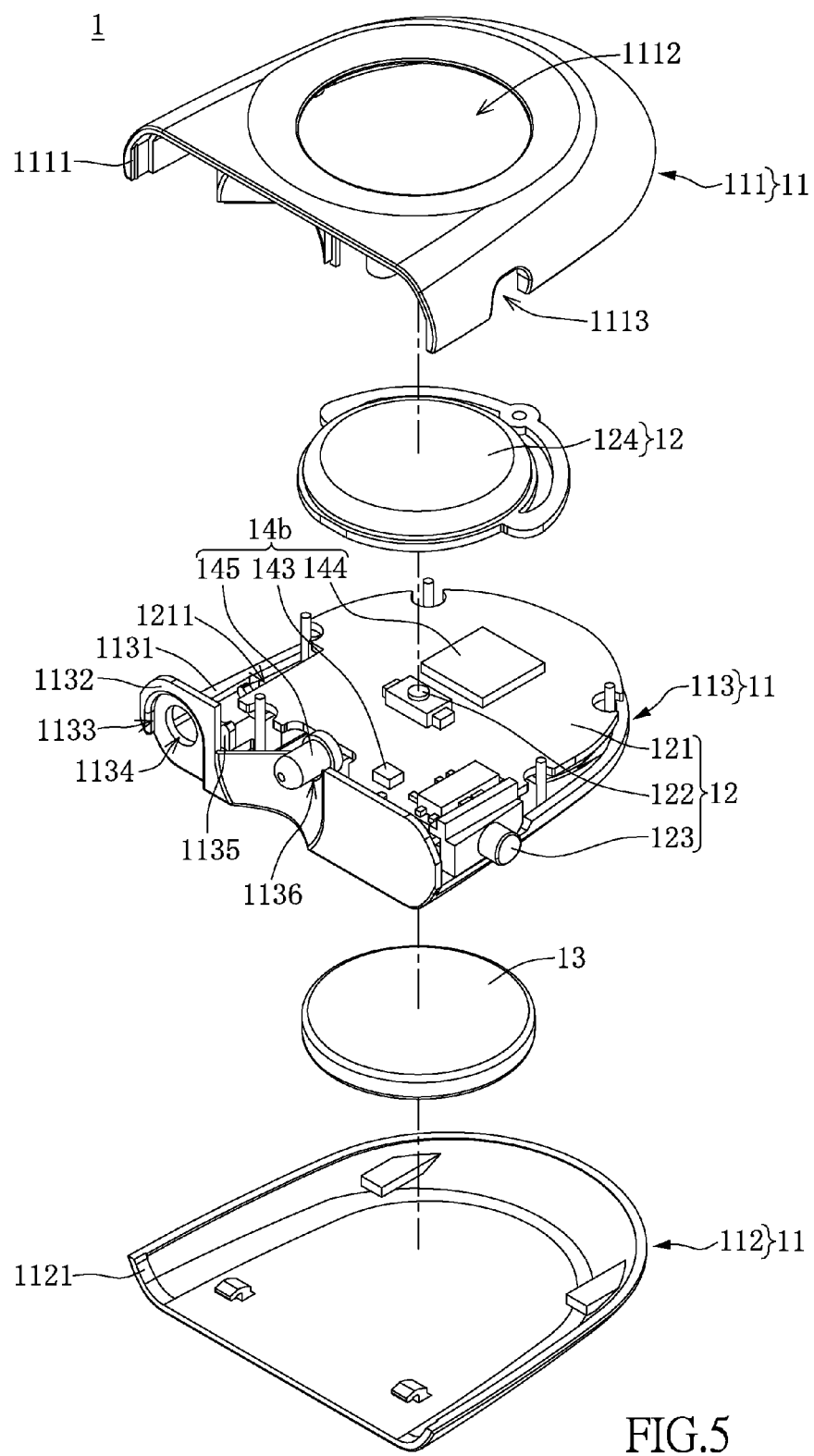
FIG. 5 is an exploded view showing a wireless selfie shutter of the complex control device.
Figure 6:
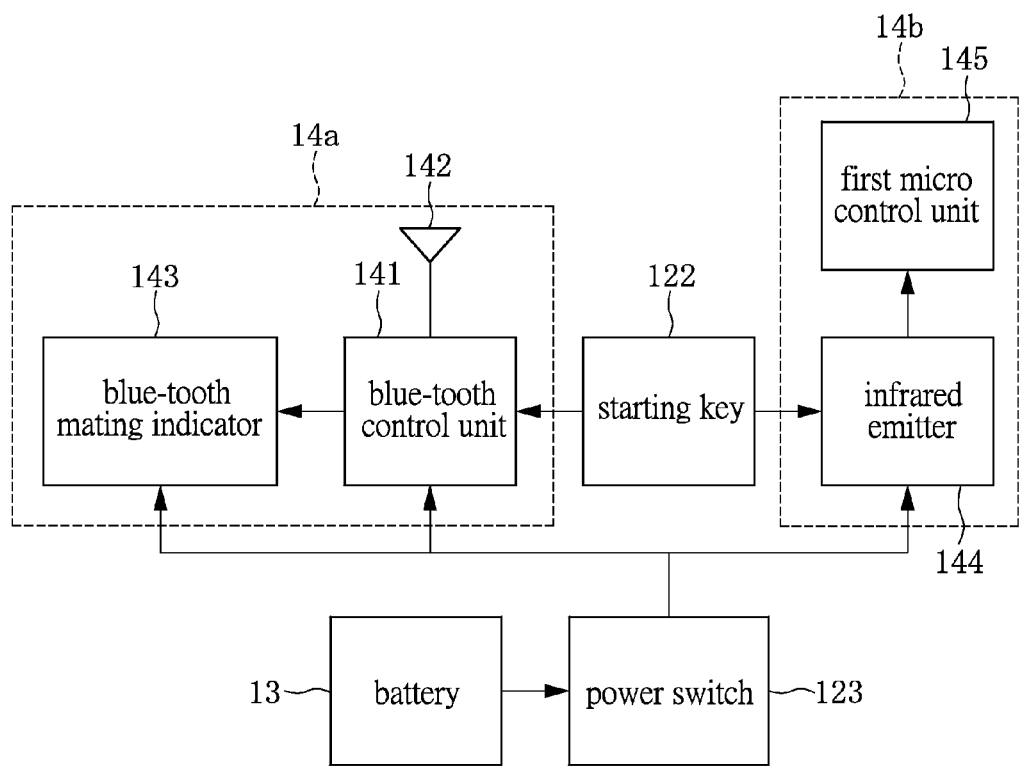
FIG. 6 is a functional block diagram of the wireless selfie shutter of the complex control device.

FIG. 5 shows the construction of each component of the wireless selfie shutter 1, FIG. 6 shows the electrical relationship of the components of the wireless selfie shutter 1, and FIGS. 3 and 4 show the relationship between the wireless selfie shutter 1 and the flasher 2.

The wireless selfie shutter 1 includes a first shell 11, a starting module 12, a battery 13, and two transmitting modules 14a, 14b. The first shell 11 has a top case 111, a bottom case 112 installed on the top case 111, and a positioning component 113 installed between the top case 111 and the bottom case 112. The positioning component 113 has a carrying plate 1131 and an end plate 1132 approximately and perpendicularly extended from the carrying plate 1131. The top case 111, the bottom case 112, and the end plate 1132 of the positioning component 113 jointly define a first accommodating space 114 (as shown in FIG. 3), and the carrying plate 1131 is arranged in the first accommodating space 113. In other words, the end plate 1132 is an outer plate of the first shell 11, and the end plate 1132 is regarded as a boundary of the first accommodating space 114.

Moreover, the top case 111 and the bottom case 112 each has a protrusion 1111, 1121 arranged out of the first accommodating space 114. The protrusions 1111, 1121 are arranged around the end plate 1132, and the protrusions 1111, 1121 and the outer surface of the end plate 1132 jointly define a trough structure, which is defined as a first combining portion 115 in the instant embodiment (as shown in FIG. 4).

Specifically, the top portion of the top case 111 has a button hole 1112 in air communication with the first accommodating space 114, and the side portion of the top case 111 has a switch hole 1113 in air communication with the first accommodating space 114. The end plate 1132 of the first combining portion 115 has an aligning groove 1133 arranged on one side thereof and an inserting hole 1134 arranged on the bottom of the aligning groove 1133 in air communication with the first accommodating space 114. The carrying plate 1131 has two positioning pillars 1135 corresponding to inserting hole 1134. The end plate 1132 of the first combining portion 115 has an opening 1136 arranged on a center portion thereof in air communication with the first accommodating space 114.

The starting module 12 has a first circuit board 121, a starting key 122 and a power switch 123 both mounted on the first circuit board 121, and a button 124. The first circuit board 121 is arranged in the first accommodating space 114 and is disposed between the top case 111 and the carrying plate 1131 of the positioning component 113. The first circuit board 121 has a notch 1211 formed on a corner thereof, and the position of the notch 1211 corresponds to the positioning pillars 1135 and the inserting hole 1134 of the positioning component 113. The starting key 122 is arranged in the first accommodating space 114, and the starting key 122 mounted on the first circuit board 121 faces the center of the button hole 1112 of the top case 111.

Moreover, the power switch 123 is arranged in the first accommodating space 114, and the power switch 123 mounted on the first circuit board 121 faces the switch hole 1113 of the top case 111. A portion of the power switch 123 passes through the switch hole 1113 for providing user operability. Additionally, the button 124 is movably disposed on the top case 111 and passes through the button hole 1112. The button 124 and the starting key 122 are in a one-to-one arrangement, thus when a user presses the button 124, the button 124 moves toward the first circuit board 121 to press the starting key 122.

The battery 13 is arranged in the first accommodating space 114, and the battery 13 is disposed between the carrying plate 1131 of the positioning component 113 and the bottom case 112. The battery 13 is electrically connected to the first circuit board 121, so the battery 13 is electrically connected to the power switch 123 via the first circuit board 121. That is to say, the battery 13 can provide energy to the wireless selfie shutter 1 at the pressing of the power switch 123.

The two transmitting modules 14a, 14b are approximately arranged in the first accommodating space 114, and the transmitting modules 14a, 14b are mounted on the first circuit board 121. The transmitting modules 14a, 14b are electrically connected to the power switch 123 and the starting key 122, thus the transmitting module 14a, 14b each outputs a starting signal at the same time as pressing the starting key 122. The two starting signals generated from the transmitting module 14a, 14b can respectively transmit to the mobile communication device 200 and the flasher 2 at the same time, thereby operating the mobile communication device 200 to take a picture and the flasher 2 to emit light.

Specifically, the transmitting module 14a in the instant embodiment (as shown in FIG. 6) includes a blue-tooth control unit 141, an antenna 142, and a blue-tooth mating indicator 143, in which the antenna 142 and the blue-tooth mating indicator 143 are electrically connected to the blue-tooth control unit 141. The transmitting module 14b in the instant embodiment includes a first micro control unit (MCU) 144 and an infrared emitter 145 electrically connected to the first MCU 144. The infrared emitter 145 protrudes from the opening 1135 of the first combining portion 115 for transmitting a signal.

The blue-tooth control unit 141, the blue-tooth mating indicator 143, and the first MCU 144 are electrically connected to the power switch 123, thereby receiving electrical energy via the power switch 123. The blue-tooth mating indicator 143 is in a twinkling state when the power switch 123 is pressed, and the blue-tooth mating indicator 143 does not mate with the corresponding mobile communication device 200 by blue-tooth at this time. The blue-tooth control unit 141 and the first MCU 144 are electrically connected to the starting key 122, thus when the starting key 122 is pressed, the blue-tooth control unit 141 transmits a starting signal to the mobile communication device 200 by the antenna 142, and the first MCU 144 transmits a starting signal to the flasher 2 by the infrared emitter 145 at the same time. Moreover, the blue-tooth mating indicator 143 mounted on the first circuit board 121 faces the top portion of the top case 111, and the top portion of the top case 111 corresponding to the blue-tooth mating indicator 143 is translucent. Thus, when the blue-tooth control unit 141 and the corresponding mobile communication device 200 are mated successfully by blue-tooth, the blue-tooth control unit 141 transmits a signal to the blue-tooth mating indicator 143 to order the blue-tooth mating indicator 143 to light continuingly, thereby showing that the connection between the wireless selfie shutter 1 and the corresponding mobile communication device 200 is established. After that, when the power switch 143 of the wireless selfie shutter 1, which has been electrically connected to the corresponding mobile communication device 200, is pressed again, the blue-tooth mating indicator 143 continuingly lights, and is not in the twinkling state.

Figure 7:
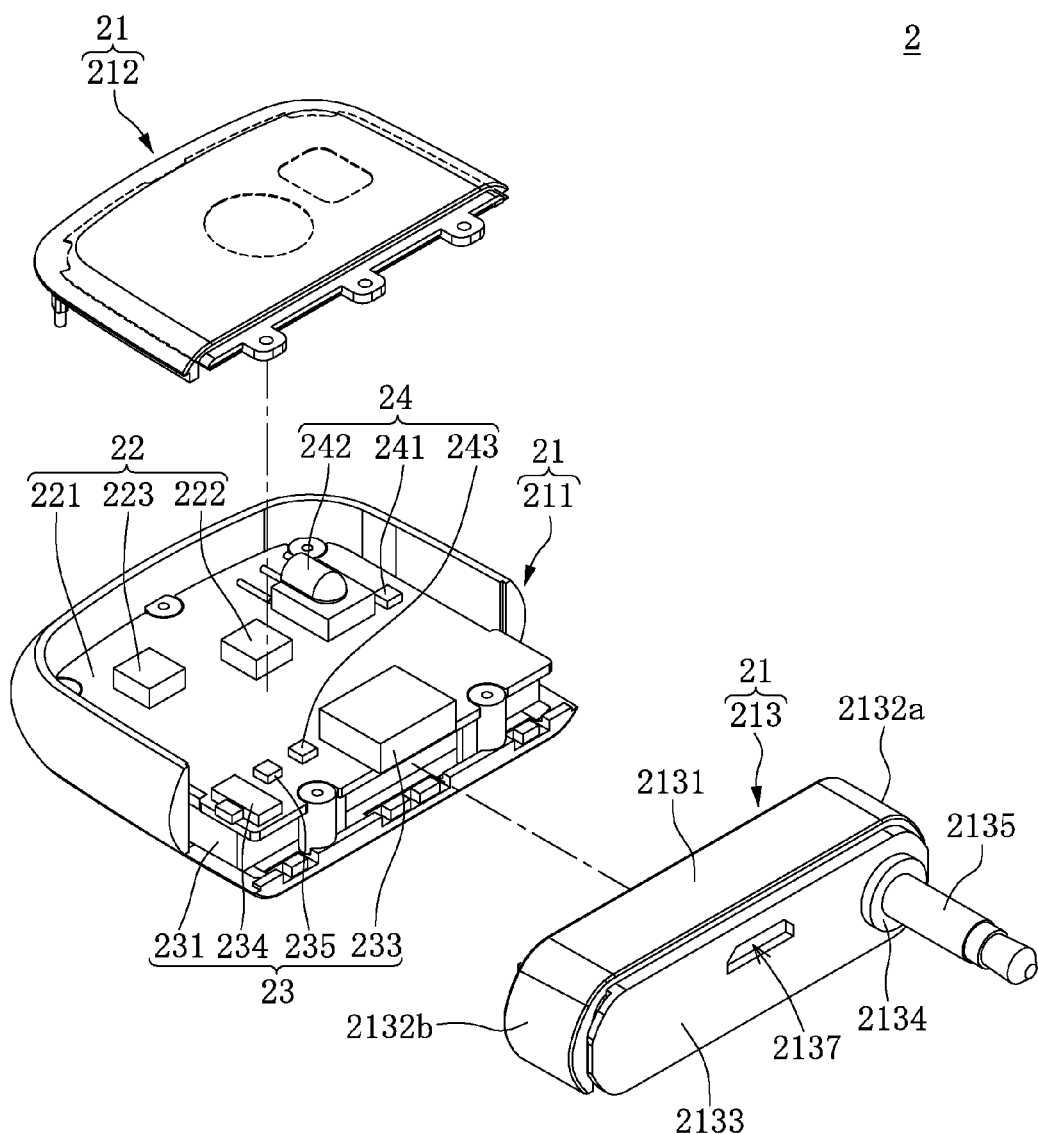
FIG. 7 is an exploded view showing a flasher of the complex control device.
Figure 8:
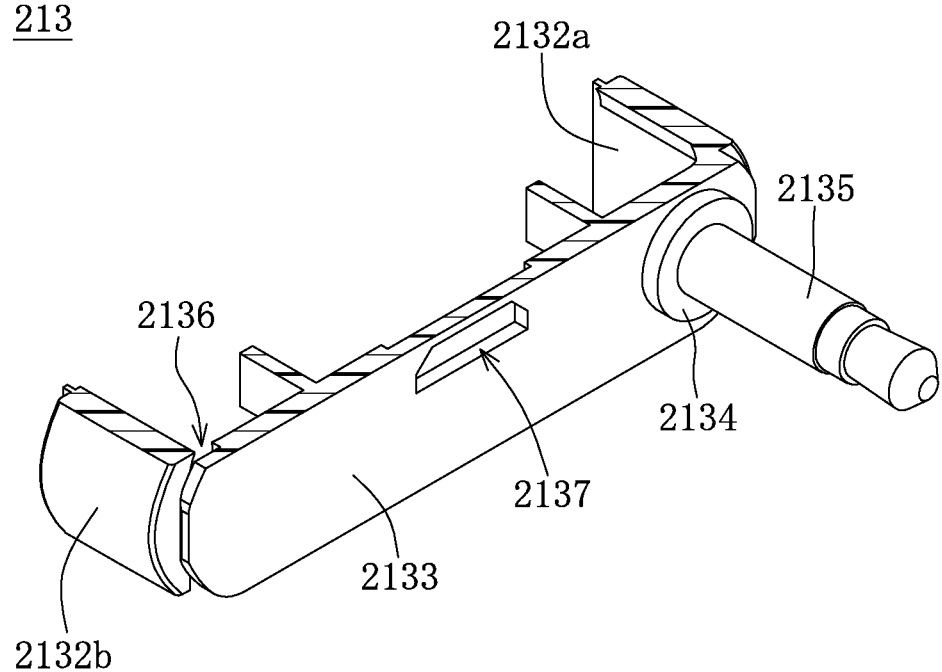
FIG. 8 is a cross-sectional view showing a connecting case of FIG. 7.
Figure 9:
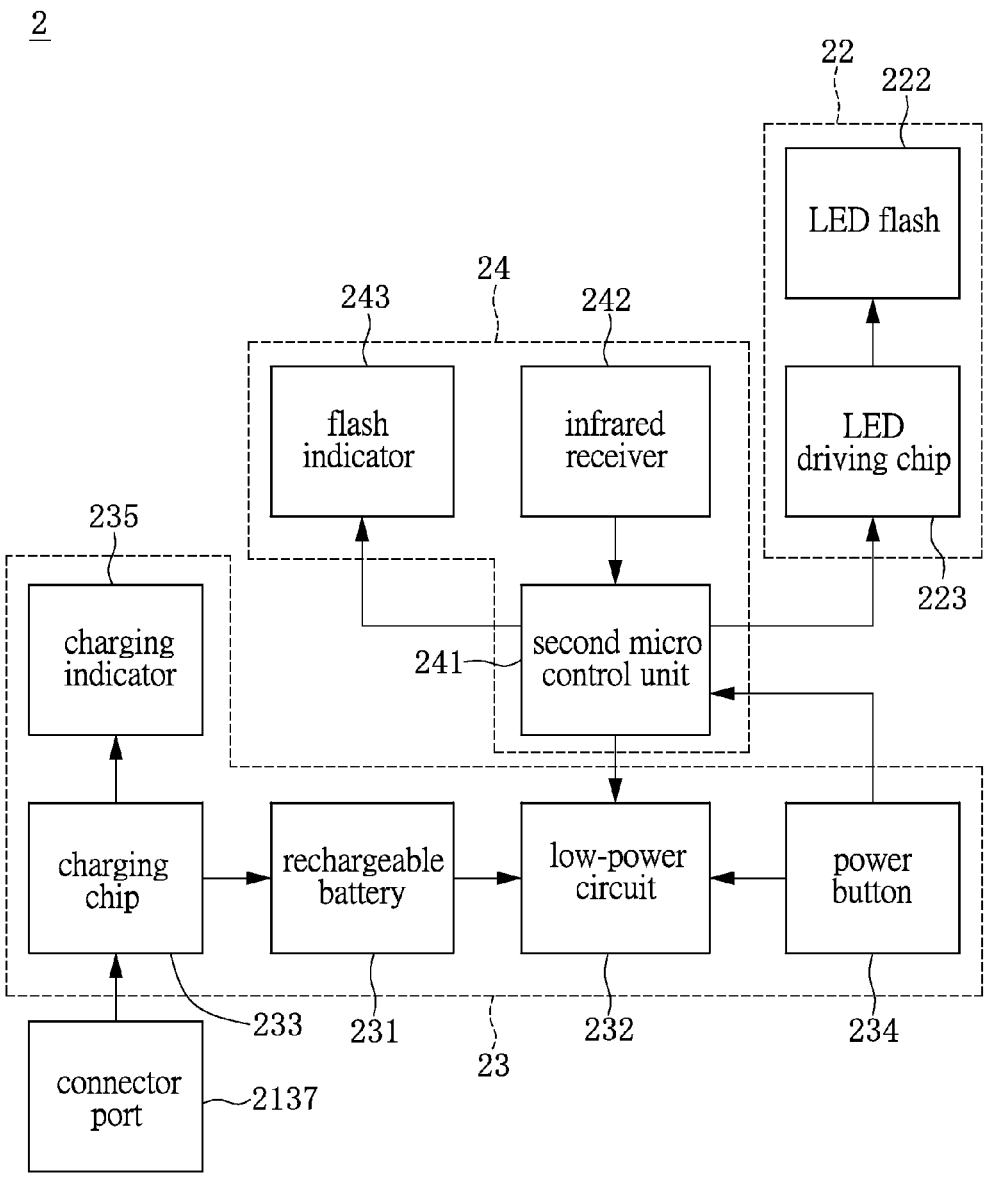
FIG. 9 is a functional block diagram of the flasher of the complex control device.

The wireless selfie shutter 1 is disclosed in the above description, and the following description discloses the flasher 2. FIGS. 7 and 8 show the construction of each component of the flasher 2, FIG. 9 shows the electrical relationship of the components of the flasher 2, and FIGS. 3 and 4 show the relationship between the wireless selfie shutter 1 and the flasher 2.

The flasher 2 includes a second shell 21, a flashing module 22, a power module 23, and a control module 24.

The second shell 21 includes a main case 211, a translucent case 212 installed on the main case 211, and a connecting case 213 installed on the main case 211 and the translucent case 212. The translucent case 212 can be provided with a shielding sheet (not labeled, shown as a dashed line in FIG. 7), so a portion of the translucent case 212 not shielded by the shielding sheet can be formed as a translucent area, thus the second shell 21 has a translucent area for allowing light to penetrate. The main case 211, the translucent case 212, and the connecting case 213 jointly define a second accommodating space 214.

Specifically, the connecting case 213 includes a base portion 2131 having a rectangular shape, two side portions 2132a, 2132b respectively extended from two opposite short edges of the base portion 2131, a connecting portion 2133 perpendicularly extended from one long edge of the base portion 2131, and an aligning tenon 2134 and an insulating pillar sequentially extended from the connecting portion 2133 in a direction, in which the direction is away from the base portion 2131. The side portions 2132a, 2132b in the instant embodiment are respectively a fixed side portion 2132a and a swingable side portion 2132b. The fixed side portion 2132a is integrally connected to the connecting portion 2133. A gap 2136 is formed between the swingable side portion 2132b and the connecting portion 2133 (as shown in FIG. 8), such that the side portion 2132b is swingable with respect to the base portion 2131 and the connecting portion 2133.

Moreover, the connecting portion 2133, the aligning tenon 2134, and the insulating pillar 2135 in the instant embodiment are jointly defined as a second combining portion 215, and the aligning tenon 2134 and the insulating pillar 2135 are arranged out of the second accommodating space 214. In other words, the connecting portion 2133 is regarded as a boundary of the second accommodating space 214, part of the connecting case 213 belongs to the second combining portion 215, and the base portion 2131 is integrally connected to the second combining portion 215. The connecting portion 2133 is plate-like, and the connecting portion 2133 conforms to the first combining portion 115 in shape. The aligning tenon 2134 conforms to the aligning groove 1133 of the first combining portion 115 in shape. The cross-section of the insulating pillar corresponds to the inserting hole 1134 of the first combining portion 115. The center the connecting portion 2133 has a connector port 2137.

The flashing module 22 is arranged in the second accommodating space 214, and the flashing module 22 includes a second circuit board 221, an LED flash 222 mounted on the second circuit board 221, and an LED driving chip 223 mounted on the second circuit board 221. The LED flash 222 mounted on the second circuit board 221 faces the center portion of the translucent case 212, and the center portion of the translucent case 212 corresponding to the LED flash 222 is the translucent area of the second shell 21 and is provided with a lens structure, thereby guiding light emitted from the LED flash 222. The LED driving chip 223 is electrically connected to the LED flash 222 via the second circuit board 221.

The power module 23 is arranged in the second accommodating space 214 and is mounted on the second circuit board 221. The power module 23 includes a rechargeable battery 231, a low-power circuit 232 and a charging chip 233 both electrically connected to the rechargeable battery 231, a power button 234 electrically connected to the low-power circuit 232, and a charging indicator 235 electrically connected to the charging chip 233. The power button 234 is electrically connected to the rechargeable battery 231 via the low-power circuit 232. The power button 234 mounted on the second circuit board 221 is arranged adjacent to the swingable side portion 2132b, such that the power button 234 can be pressed by pressing the swingable side portion 2132b.

Moreover, the charging chip 233 mounted on the second circuit board 221 is arranged adjacent to the connector port 2137 of the second shell 21, thus an external power connector (not shown) can insert into the connector port 2137 for charging the rechargeable battery 223 via the charging chip 233. The charging indicator 235 mounted on the second circuit board 221 faces the base portion 2131 of the connecting case 213, and part of the base portion 2131 corresponding to the charging indicator 235 is translucent, thereby showing the light of the charging indicator 235 when the rechargeable battery 223 is charging.

The control module 24 is arranged in the second accommodating space 214 and is mounted on the second circuit board 221. The control module 24 includes a second MCU 241, an infrared receiver 242, and a flash indicator 243, in which the infrared receiver 242 and the flash indicator 243 are electrically connected to the second MCU 241. The infrared receiver 242 mounted on the second circuit board 2221 faces the translucent case 212, and a portion of the translucent case 212 corresponding to the infrared receiver 242 is also the translucent area of the second shell 21 for receiving the starting signal emitted from the infrared emitter 145 of the transmitting module 14b. The infrared receiver 242 can transmit the starting signal to the second MCU 241.

Moreover, the second MCU 241 is electrically connected to the power button 234, that is to say, the rechargeable battery 231 can provide energy to operate the flasher 2 by pressing the power button 234. The second MCU 241 is electrically connected to the LED driving chip 223, thus the second MCU 241 can order the LED flash 222 to light via the LED driving chip 223 when receiving the starting signal. The flash indicator 243 mounted on the second circuit board 221 faces the base portion 2131 of the connecting case 213, and part of the base portion 2131 corresponding to the flash indicator 243 is translucent, thereby showing the light of the flash indicator 243 when the starting key 122 of the wireless selfie shutter 1 is pressed.

The above description discloses the wireless selfie shutter 1 and the flasher 2 of the instant embodiment. The wireless selfie shutter 1 and the flasher 2 in the instant embodiment has a combined state (as shown in FIG. 1) and a using state (as shown in FIG. 10), and the following description discloses the two states.

When the wireless selfie shutter 1 and the flasher 2 are in the combined state, the flasher 2 is detachably installed to the wireless selfie shutter 1, and the second combining portion 215 is inserted into the first combining portion 115. Specifically, the connecting portion 2133 of the connecting case 213 is wedged to the protrusion 1111 of the top case 111, the insulating pillar 2135 passes through the inserting hole 1134 and is arranged in the first accommodating space 114. The insulating pillar 2135 is retained by the positioning pillars 1135 of the positioning component 113 and is arranged in a space defined by the notch 1211 of the first circuit board 121. The aligning tenon 2134 is wedged to the aligning groove 1133.

Thus, the complex control device 100 is easily to carry and the conditions of loss or forgetting to carry the flasher 2 can be prevented by the flasher 2 being detachably installed to the wireless selfie shutter 1.

When the wireless selfie shutter 1 and the flasher 2 are adjusted from the combined state to the using state, the side portions 2132a, 2132b of the flasher 2 needs to be pressed to separate the flasher 2 from the wireless selfie shutter 1. During separating the flasher 2 from the wireless selfie shutter 1, the swingable side portion 2132b needs to be pressed so as to press the power button 234. Thus, when separating the flasher 2 from the wireless selfie shutter 1, the power button 234 can be pressed at the same time to cause the rechargeable battery 231 to provide energy to operate the flasher 2.

Accordingly, the power button 234 is provided in a hidden manner to cause the appearance of the flasher 2 to be more beautiful and to provide the user a more convenient operating manner, which is by starting the flasher 2 when separating the flasher 2 from the wireless selfie shutter 1. The flasher 2 is started by the power button 234 for example, but is not limited thereto.

After separating the flasher 2 from the wireless selfie shutter 1, the insulating pillar 2135 is used to insert into the connector jack 202 of the mobile communication device 200, and the position of the flasher 2 is adjusted to make sure that the translucent case 212 of the flasher 2 and front camera 201 of the mobile communication device 200 face the same direction. At this time, the flasher 2 and the mobile communication device 200 are electrically isolated with each other. After that, the user can press the button 124 of the wireless selfie shutter 1 to press the starting key 122 for causing the two transmitting modules 14a, 14b to respectively transmit the starting signals to the mobile communication device 200 and the control module 24 of the flasher 2, thus the front camera 201 of the mobile communication device 200 can be operated to take a picture and the LED flash 222 of the flasher 2 can be operated to flash.

Additionally, the instant disclosure also provides a selfie apparatus (as shown in FIG. 10) including the complex control device 100 and the mobile communication device 200.

[The Possible Effect of the Instant Disclosure]

In summary, the complex control device and the selfie apparatus of the instant disclosure are provided with flash, which is electrically isolated from the mobile communication device, the flasher can be positioned on the mobile communication device by inserting the insulating pillar into the connector jack, and the front camera of the mobile communication device and the LED flash of the flasher can be operated at the same time by pressing a single starting key. Thus, in a place or time of relatively inadequate light, the front camera of the communication device can be used to get a quality picture by the complex control device.

Moreover, the complex control device is easily to carry and the conditions of loss or forgetting to carry the flasher can be prevented by the flasher being detachably installed to the wireless selfie shutter. The power button is provided in a hidden manner to cause the appearance of the flasher to be more beautiful and provide the user a more convenient operating manner, which is by starting the flasher when separating the flasher from the wireless selfie shutter.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A complex control device, comprising:
   a wireless selfie shutter, comprising:
      a first shell surroundingly defining a first accommodating space, wherein the first shell has a first combining portion, and the first combining portion has an inserting hole in air communication with the first accommodating space;
      a starting key arranged in the first accommodating space of the first shell;
      two transmitting modules arranged in the first accommodating space of the first shell, wherein the transmitting modules are electrically connected to the starting key, and the transmitting modules are configured to respectively transmit two starting signals by pressing the starting key; and
      a battery arranged in the first accommodating space of the first shell, wherein the battery is configured to provide energy to operate the wireless selfie shutter; and
   a flasher detachably combined with the wireless selfie shutter, comprising:
      a second shell surroundingly defining a second accommodating space, wherein the second shell has a translucent area and a second combining portion, the second combining portion has an insulating pillar arranged out of the second accommodating space, wherein the second combining portion is detachably combined with the first combining portion, and the insulating pillar passes through the inserting hole and is arranged in the first accommodating space;
      an LED flash arranged in the second accommodating space of the second shell, wherein the LED flash faces the translucent area of the second shell;
      a control module arranged in the second accommodating space of the second shell, wherein the control module is electrically connected to the LED flash and is configured to drive the LED flash for lighting; and
      a rechargeable battery arranged in the second accommodating space of the second shell, wherein the rechargeable battery is configured to provide an energy to operate the flasher;
   wherein when the flasher is separated from the wireless selfie shutter, the insulating pillar is configured to insert into a connector jack of a mobile communication device without any electrical connection therebetween, and the two transmitting modules are respectively transmitting two starting signals to the mobile communication device and the control module of the flasher for causing the mobile communication device to take a picture and the LED flash of the flasher to light at the same time by pressing the starting key.

2. The complex control device as claimed in claim 1, wherein the first combining portion having a trough shape includes an end plate and at least one protrusion around an outer edge of the end plate, the end plate is configured to be part of a boundary of the first accommodating space, the inserting hole is arranged on the end plate, the protrusion is arranged out of the first accommodating space; and wherein the second combining portion has a connecting portion, the connecting portion is configured to be part of a boundary of the second accommodating space, the connecting portion is detachably wedged to the protrusion.

3. The complex control device as claimed in claim 2, wherein the wireless selfie shutter has a first circuit board arranged in the first accommodating space, and the starting key, the two transmitting modules, and the battery are electrically connected to the first circuit board, wherein the first circuit board has a notch, the insulating pillar is arranged in a space defined by the notch of the first circuit board.

4. The complex control device as claimed in claim 2, wherein the flasher has a power button electrically connected to the rechargeable battery and the control module, the rechargeable battery is configured to provide energy to operate the flasher by pressing the power button.

5. The complex control device as claimed in claim 4, wherein the second shell has a connecting case, and the connecting case has a base portion, the second combining portion is connected to the base portion, and two side portions respectively are extended from two opposite ends of the base portion; wherein the two side portions are respectively defined as a fixed side portion and a swingable side portion, the fixed side portion is connected to the connecting portion, a gap is formed between the swingable side portion and the connecting portion, and wherein the power button is arranged in the second accommodating space and is arranged adjacent to the swingable side portion, the swingable side portion is configured to be pressed for contacting and triggering the power button.

6. The complex control device as claimed in claim 1, wherein the flasher has a connector port for providing insertion of an external power to charge the rechargeable battery.

7. The complex control device as claimed in claim 1, wherein the wireless selfie shutter has a button disposed on the first shell, the button and the starting key are in an one-to-one arrangement, the button is movable to press the starting key.

8. A selfie apparatus, comprising:
   a mobile communication device having a front camera and a connector jack, wherein the mobile communication device is provided without any flasher arranged around the front camera; and
   a complex control device, comprising:
      a wireless selfie shutter, comprising:
         a first shell surroundingly defining a first accommodating space, wherein the first shell has a first combining portion, and the first combining portion has an inserting hole in air communication with the first accommodating space;
         a starting key arranged in the first accommodating space of the first shell;
         two transmitting modules arranged in the first accommodating space of the first shell, wherein the transmitting modules are electrically connected to the starting key, and the transmitting modules are configured to respectively transmit two starting signals by pressing the starting key; and
         a battery arranged in the first accommodating space of the first shell, wherein the battery is configured to provide an energy to operate the wireless selfie shutter; and
      a flasher detachably combined with one of the wireless selfie shutter and the mobile communication device, comprising:
         a second shell surroundingly defining a second accommodating space, wherein the second shell has a translucent area and a second combining portion, the second combining portion has an insulating pillar arranged out of the second accommodating space;

an LED flash arranged in the second accommodating space of the second shell, wherein the LED flash faces the translucent area of the second shell;

a control module arranged in the second accommodating space of the second shell, wherein the control module is electrically connected to the LED flash and is configured to drive the LED flash for lighting; and a rechargeable battery arranged in the second accommodating space of the second shell, wherein the rechargeable battery is configured to provide energy to operate the flasher;

wherein when the flasher is combined with the wireless selfie shutter, the second combining portion is detachably combined with the first combining portion, and the insulating pillar passes through the inserting hole and is arranged in the first accommodating space;

wherein when the flasher is combined with mobile communication device, the insulating pillar is inserted into the connector jack without any electrical connection therebetween, and the two transmitting modules respectively transmit two starting signals to the front camera of the mobile communication device and the control module of the flasher causing the front camera of the mobile communication device to take a picture and the LED flash of the flasher to light at the same time by pressing the starting key.

9. The selfie apparatus as claimed in claim 8, wherein the first combining portion having a trough shape includes an end plate and at least one protrusion around an outer edge of the end plate, the end plate is configured to be part of a boundary of the first accommodating space, the inserting hole is arranged on the end plate, the protrusion is arranged out of the first accommodating space; and wherein the second combining portion has a connecting portion, the connecting portion is configured to be part of a boundary of the second accommodating space, the connecting portion is detachably wedged to the protrusion.

10. The selfie apparatus as claimed in claim 9, wherein the second shell has a connecting case, and the connecting case has a base portion, the second combining portion connected to the base portion, and two side portions respectively extended from two opposite ends of the base portion; wherein the two side portions are respectively defined as a fixed side portion and a swingable side portion, the fixed side portion is connected to the connecting portion, a gap is formed between the swingable side portion and the connecting portion, wherein the flasher has a power button electrically connected to the rechargeable battery and the control module, the rechargeable battery is configured to provide energy to operate the flasher by pressing the power button, and wherein the power button is arranged in the second accommodating space and is arranged adjacent to the swingable side portion, the swingable side portion is configured to be pressed for contacting and triggering the power button.

* * * * *